Patented May 7, 1940

2,199,900

UNITED STATES PATENT OFFICE 2,199,900

RESINOUS COMPOSITION

George S. Weith, Caldwell, N. J., assignor to Bakelite Corporation, New York, N. Y., a corporation of Delaware No Drawing. Application August 18, 1936, Serial No. 96,675

24 Claims. (Cl. 260—42)

This invention relates to the production of resinous compositions, and more particularly to the production of resinous compositions of improved shock resistance including resins of the alkyd type, obtained by the reacting polyhydric alcohols and polybasic acids and converting the products to the infusible, insoluble condition, in combination with other resinous substances.

The formation of resinous substances from glycerol and polybasic acids usually proceeds in three stages: first, the formation of a fusible acetone soluble product; second, a difficultly fusible material, practically insoluble in acetone; and third, an infusible, insoluble final condensation product. These final condensation products are superior in resistance to water and solvents to the products formed during the second stage, but have found little use except when formed under such conditions that they can be used directly as produced, as for example, in cast articles or in baked coatings.

I have found, however, that when such resins, which have been advanced to the final infusible state, are added in a finely divided state to resinous bodies of a dissimilar nature they impart to the resulting compositions certain valuable characteristics, the most important being a degree of toughness or elasticity greater than that originally possessed by the material to which they are added. I have found, moreover, that if such advanced resins are introduced into a dissimilar resin which is at a stage of advancement such that it is still fusible but potentially convertible into the infusible state; and if the mixture is then advanced to the infusible, insoluble state, the resulting product will have a much higher resistance to shock than the original fusible material advanced to the infusible state without the addition of the advanced glycerol-polybasic acid resin.

Thus, I have found that the addition of as little as 3% of such advanced alkyd resins to a resin of the phenol-aldehyde type will increase the shock resistance 15–30% above that originally possessed by the phenol-aldehyde resin. I have noted a similar effect when these resins are added to urea formaldehyde resinous compositions, more particularly, to urea resin syrups or varnishes such as are used for the impregnation of paper, textiles and the like. I have found that the addition of about 10–30% of powdered, infusible alkyd resin to urea varnish effectively prevents crazing or cracking of the resinous surface of a panel obtained when such a varnish is used for the impregnation of paper sheets and the impregnated paper sheets are subjected to heat and pressure.

The advanced alkyd resinous compositions may be prepared in a number of ways. Preferably, however, glycerol is heated with a polybasic acid, such as phthalic anhydride, in the proportion of one part of glycerine to two parts phthalic anhydride in an open kettle. The heating is continued until the temperature of the reaction mass is about 220–230° C. when the resin becomes extremely viscous and is approaching the gel stage. This stage may be recognized by the tendency of the hot resin to "string" from a rod inserted in the mass and then withdrawn. At this stage the resin is dumped from the kettle into pans to a thickness of approximately 3/16 to 1/4 inch. The resin is allowed to cool, and then given a heat treatment of about a day and a half at 140° C. It is then ground in a ball mill until the resin will pass 160 mesh sieve. The powdered resin is then given another heat treatment of 2 hours at 140° C., the resin again ground as above and given a further heat treatment of 6–8 hours at 140° C. The grinding is repeated, followed by another heat treatment of 15 hours at 140° C., and this in turn is followed by a grinding operation and a final heat treatment of 24 hours at 140° C. I have found that this intermediate heating and grinding is highly effective in obtaining a finely divided advanced resinous composition. Continued heating toughens the resinous composition and makes it increasingly more difficult to grind, but I have discovered that by interrupting the heating and grinding the resinous composition as its advancement progresses, I am able to retard the fluxing or fusion of the resinous particles, which occurs during the heating which follows each grinding, such fluxing being more pronounced during the early part of the heating process. By thus preventing the formation of large, difficultly grindable agglomerates and by continually exposing fresh resin surfaces to the action of heat, the time of the grinding operation and the time required to advance the resin is greatly diminished, and I have found it possible to produce by this method in a period of 100 to 120 hours at 140° C. powdered alkyd resins in an advanced state of polymerization or cure which will pass 160–200 mesh screen.

I have also found that this advanced type of alkyd resin composition may be still further improved as regards insolubility and infusibility if, after heating and grinding as above described, it is refluxed in a solvent such as acetone, ethyl acetate, ethyl ether or ethylene glycol, or the like, for several hours or allowed to soak in acetone for several days at a temperature slightly above room temperature. Such a treatment removes to a great extent any of the soluble intermediate form of alkyd resin still remaining. The same result may also be achieved by boiling the advanced alkyd resin in water, either at atmospheric pressure or at greater than atmospheric pressure. Thus, I have found that by heating the powdered resin under pressure in water at 140° C. for 3½ hours and then filtering out the resinous material, a product is obtained which was completely infusible and insoluble in acetone and water.

The powdered advanced alkyd resin may be added to another dissimilar resin in a variety of ways: by grinding it with the resin in a ball mill; by stirring the powdered alkyd resin into the molten dissimilar resin; or, if the dissimilar resin is in liquid form, a mere dispersng of the alkyd resn in the liquid resin will suffice. In general it is preferable to disperse the alkyd resin in the fused or liquid form of the dissimilar resin. The amount of advanced alkyd resin to be added depends somewhat on the nature of the resin and also on the result to be achieved. I have found that if as little as 3% of the total resin constituent is advanced alkyd resin, an improved toughness and resistance to shock will be noted, while as much as 50% can be tolerated by most other resins without showing a marked falling away from the maximum improvement which can be attained.

While the foregoing methods for advancing an alkyd resin to the infusible insoluble state are particularly adaptable to a resin prepared from glycerol and phthalic anhydride, these same procedures may be used to transform any heat convertible alkyd resin prepared from other polyhydric alcohols such as sorbitol, pentaerythritol and other polybasic acids as, for example, succinic, malic, maleic, and the like. The proportions of polyhydric alcohol and polybasic acid used is preferably that they are the chemical equivalents of the proportions given for glycerol and phthalic anhydride; and in general, it is desirable to have an excess of about ½ mol of the polybasic acid above that theoretically required to combine with the polyhydric alcohol.

The temperature and time of heat treatment may be varied within certain limits, and in general, the higher the temperature the less time required. However, it is preferable not to exceed temperatures of 140° C., as otherwise an undesirable darkening in the color of the resin occurs. Temperatures lower than 125° C. are not advisable, since the time of hardening becomes too prolonged. The thickness of the resin layer during the heating should also not greatly exceed ¼ inch; otherwise the hardening of the resin will be non-uniform throughout its mass. For best results the resin should be ground to at least 100 mesh and preferably to 150-200 mesh.

Solvent or water extraction of the hardened resin, while improving the properties of the resin, is not necessary for many uses where only added shock resistance is desired. The alkyd resins, however, are in general less water resistant than certain other types of resins, for example, the phenol-formaldehyde resins, and their addition to these more water resistant types may have an adverse effect on the water resistance while improving the shock resistance. This lack of water resistance in the final hardened alkyd resin is probably due to the presence of small amount of intermediate resin which only a prolonged heat treatment would finally convert to the infusible, insoluble state. When a highly water resistant, infusible, insoluble type of alkyd resin is desired it may be prepared without resorting to an unduly prolonged hardening time by extracting the hardened resin with solvent or water as above described. Resins thus prepared impart shock resistance comparable with that of the untreated resins, and do not materially decrease the water resistance.

The following examples illustrate the nature of the improvement which these advanced alkyd resins impart to other resins:

*Example 1*

A urea resin is prepared by refluxing 180 parts of urea, 486 parts of formalin and 12 grams ammonium hydroxide (28% solution) until a sample of the resin, when cooled to room temperature, did not become turbid. The reaction mix is then concentrated under diminished pressure until the resin becomes quite viscous. This typically requres about 45 minutes and the removal of about 200 parts of distillate. At this point a mixture of 175 parts of ethyl lactate and 350 parts of alcohol are added to give a varnish containing about 60 parts of urea formaldehyde resin.

200 parts of the varnish prepared as described above are mixed with 100 grams of an advanced alkyd resin composition, prepared as follows: One part of glycerol is heated with two parts of phthalic anhydride, the temperature being gradually increased to 220° C., at which point the resin becomes quite viscous and can be drawn into a string at 180-190° C. The resin is discharged into pans to a thickness of ⅛ inch and then hardened by heating for 36 hours at 140° C. It is then ground to pass 160 mesh sieve. The powdered resin is spread in layers to a depth of ⅛ inch and again hardened for 2 hours at 140° C. The grinding is repeated and the resin again heated six to eight hours at 140° C. in the same manner as described and then again reground and heated 15 hours at 140° C.; and then ground and given a fifth heat treatment of 24 hours at 140° C. or a total heat treatment of 100-120 hours at 140° C. The resulting resin is light colored, infusible and practically unaffected by acetone or cold water. Under pressures of 1500 lbs. per sq. in. and temperature of 160° C. it can be consolidated into a disk which appears to have a continuous structure, but upon subjecting this disk to temperature of 80° C., it becomes rough and distorted with loss of shape and size, indicating that the particles of resin have only been superficially stuck together.

175 parts of lithopone, 1 part of carnauba wax, 200 parts alcohol and 50 parts ethyl lactate are added to the above described urea varnish-advanced alkyd resin composition, and the whole mixed together in a ball mill to give an enamel which was used to coat sheets of absorbent alpha cellulose paper. This coating may be accomplished by spraying, brushing, dipping, roll coating or any other convenient method. The sheets are then dried at 120° C. for 4-5 minutes and then superimposed and consolidated under a pressure of 1000-1200 lbs. per sq. inch at a temperature of 140-150° C. for about 30 minutes. The resulting laminated panel has an excellent surface. The surface of such a panel was found to be completely free of checks and crazing after an exposure of 3 months on the tide racks in Florida. Another laminated panel, prepared from a similar urea varnish containing no advanced alkyd resin, showed marked crazing 24 hours after being exposed to similar weathering conditions.

Example 2

A phenolic resin is prepared by refluxing 3000 parts of formalin and 1500 parts of phenol and 38.6 parts of barium hydroxide ($Ba(OH)_2 12H_2O$) until a test sample on analysis shows a concentration of 7% formaldehyde. This reaction mixture is then concentrated under diminished pressure (30 mm. mercury) until the temperature is about 50° C. The resinous syrup is then neutralized with sulfuric acid and then made slightly acid with phosphoric acid. The dehydration is continued until the temperature reached 102° C. when the resin is discharged into pans. It is a light colored, hard, brittle, fusible resin having a softening point of 160–165° F. When this resin is molded under pressure of steam at 130° C. for 2½ hours into bars ½"x¼"x2½" long, the bars, tested on an Izod machine, have an impact strength of 6–8 foot pounds/in. sq.

100 parts of the above described fusible, phenolic resin are now mixed with 30 parts of an advanced alkyd resin, prepared as described in Example 1, but which has been given the following additional treatment.

The powdered heat treated alkyd resins are mixed with an equal weight of water and heated under pressure of steam at 140° C. for 3½ hours. The whole is then cooled and the resinous portion filtered off and dried for 2 hours at 80° C. The resin so treated is improved approximately 50% in its water resistance over the advanced alkyd resin described in Example 1; otherwise, its properties are similar. To mix it with the phenolic resin, it is added to the phenolic resin just after neutralization, or it may be milled in with the final, brittle, fusible phenolic resin.

To carry out the first procedure the powdered, advanced, steam treated and dried alkyd resin is suspended in an equal weight of alcohol and then added to the phenolic resin syrup, and the dehydration of the mixture carried out as above described for the phenolic resin without added alkyd resin. In the second procedure, the alkyd resin and the hard, brittle, fusible phenolic resin are milled on differential rolls heated to 80° C. for about 5–7 minutes. The resulting mix is cooled and ground.

The first procedure gives the better results. Resins so prepared, when molded into test bars similar to that described for the phenolic resin, have an impact strength of 10–12 ft. lbs., while similar bars molded by the second procedure, have an impact strength of 8–10 ft. lbs.

These phenol-formaldehyde resins containing advanced alkyd resin may, if desired, be used as casting resins, and when so employed they may be melted in a lead mold and allowed to harden at 80° C. at atmospheric pressure for from four to five days. The finished piece shows a shock resistance improved to an extent substantially equal in per cent to that exhibited by comparable resins molded under heat and pressure, as described above.

Example 3

A urea resin is prepared by heating 3000 parts of formalin, 1000 parts of urea and 25 parts of a 60% solution of ethylene diamine to boiling and then allowing to cool to room temperature. Then 500 additional parts of urea are added. The resulting resin syrup is clear water-white and shows substantially no precipitation after standing one month at 25° C. It has an initial viscosity of 30 centipoises which increases to about 70 centipoises at the end of one month's standing at 25° C. It has a solid content of 45%.

1000 parts of an advanced alkyd resin, prepared as described in Example 1, are added to the urea syrup, along with about 400 parts alcohol. This composition is then used to coat an absorbent alpha cellulose paper, about .004 inch thick, in the usual manner for treating paper for preparing laminated material. The treated paper is heated 6 minutes at 125° C. and then has a resin content of about 61%. Sheets of this paper are consolidated under heat and pressure of 1000–1200 lbs. per sq. in. at a temperature of 135° C. for about 20–30 minutes. The resulting panels are translucent, have a good gloss and are free from all surface checks and crazing after an exposure of 3 months to the weather.

Compositions containing phenol-formaldehyde resins together with advanced alkyd resins have been found to be of value in prosthetic dentistry for the preparation of full or partial dentures, the added resistance to shock which the finished denture possesses making it superior to the usual type of phenol-formaldehyde resin dentures. These resins may also be used as casting resins and, when so employed, the resulting cast articles are stronger and tougher than articles made from a similar phenol-formaldehyde resin in which no advanced alkyd resin has been incorporated. This makes possible the rapid production of cast articles containing alkyd resins and having the toughness and strength associated with cast alkyd resins, which have heretofore required weeks and months to bring to the finished state where they possess a comparable mechanical strength.

Dispersions of urea-formaldehyde resins containing advanced alkyd resins, have been found useful for preparing highly inert, water resistant, light colored and light resistant laminated materials, free from the objectionable crazing commonly associated with laminated materials prepared from urea-formaldehyde resins. These dispersions are particularly suitable for the preparation of so-called surface sheets, since the resin content of the sheet may be considerably increased to give added gloss and transparency without incurring the brittleness, crazing and checking so common to the usual high resin content surface sheets.

I claim:

1. A method of producing a resinous composition of improved shock resistance which comprises admixing a finely divided alkyd resin in the infusible, insoluble condition with a heat hardenable non-alkyd resin.

2. A method of producing a resinous composition of improved shock resistance which comprises admixing a finely divided alkyd resin in the infusible, insoluble condition with a heat hardenable resin selected from the group consisting of phenol-aldehyde and urea-aldehyde resins.

3. A method of producing a resinous composition of improved shock resistance which comprises admixing a finely divided alkyd resin in the infusible, insoluble condition with a heat hardenable phenol-aldehyde resin.

4. A method of producing a resinous composition of improved shock resistance which comprises admixing a finely divided alkyd resin in the infusible, insoluble condition with a heat hardenable urea-aldehyde resin.

5. A method of producing a resinous composition of improved shock resistance which comprises admixing from 3 to 50% of a finely divided alkyd resin in the infusible, insoluble condition with a heat hardenable resin selected from the group consisting of phenol-aldehyde and urea-aldehyde resins.

6. A method of producing a resinous composition which comprises converting an alkyd resin to the infusible, insoluble condition, grinding the resin and admixing the ground resin with a heat hardenable resin selected from the group consisting of phenol-aldehyde and urea-aldehyde resins.

7. A method of producing a resinous composition which comprises converting an alkyd resin to the infusible and insoluble condition by repeatedly heating and grinding the resin and admixing the ground resin with a heat hardenable resin selected from the group consisting of phenol-aldehyde and urea-aldehyde resins.

8. A method of producing a resinous composition which comprises converting an alkyd resin to the infusible and insoluble condition by heating for about 100 to 120 hours at about 140° C., grinding the resin and admixing the ground resin with a heat hardenable resin selected from the group consisting of phenol-aldehyde and urea-aldehyde resins.

9. A method of producing a resinous composition which comprises converting an alkyd resin to the infusible and insoluble condition by heating for about 100 to 120 hours at about 140° C., grinding the resin a plurality of times during the heating operation and admixing the ground resin with a heat hardenable resin selected from the group consisting of phenol-aldehyde and urea-aldehyde resins.

10. A method of producing a resinous composition which comprises converting an alkyd resin to the infusible, insoluble condition, grinding the resin to a fineness of at least 100 mesh and admixing the ground resin with a heat hardenable resin selected from the group consisting of phenol-aldehyde and urea-aldehyde resins.

11. A method of producing a resinous composition which comprises converting an alkyd resin to the infusible, insoluble condition, grinding the resin and dispersing the ground resin in a heat-hardenable resin selected from the group consisting of phenol-aldehyde and urea-aldehyde resins.

12. A method of producing a resinous composition which comprises converting an alkyd resin to the infusible, insoluble condition, grinding the resin and dispersing the ground resin in a liquid heat-hardenable resin selected from the group consisting of phenol-aldehyde and urea-aldehyde resins.

13. A method of producing a resinous composition which comprises converting an alkyd resin to the infusible, insoluble condition, grinding the resin and dispersing the ground resin in a solution of a heat-hardenable resin selected from the group consisting of phenol-aldehyde and urea-aldehyde resins.

14. A method of producing a resinous composition which comprises converting an alkyd-resin to the infusible, insoluble condition, grinding the resin, subjecting the resin to the action of a solvent for incompletely converted resin, and dispersing the finely divided resin in a heat-hardenable resin selected from the group consisting of phenol-aldehyde and urea-aldehyde resins.

15. A method of producing a resinous composition which comprises converting an alkyd-resin to the infusible, insoluble condition, grinding the resin, extracting the resin with an organic liquid solvent, and dispersing the finely divided resin in a heat-hardenable resin selected from the group consisting of phenol-aldehyde and urea-aldehyde resins.

16. A method of producing a resinous composition which comprises converting an alkyd-resin to the infusible, insoluble condition, grinding the resin, heating the resin with water, and dispersing the finely divided resin in a heat-hardenable resin selected from the group consisting of phenol-aldehyde and urea-aldehyde resins.

17. A resinous composition comprising a heat-hardenable non-alkyd resin having dispersed therein a finely divided alkyd resin in the infusible, insoluble condition.

18. A resinous composition comprising a heat-hardenable resin selected from the group consisting of phenol-aldehyde and urea-aldehyde resins having dispersed therein a finely divided alkyd resin in the infusible, insoluble condition.

19. A resinous composition comprising a heat-hardenable phenol-aldehyde resin having dispersed therein a finely divided alkyd resin in the infusible, insoluble condition.

20. A resinous composition comprising a heat-hardenable urea-aldehyde resin having dispersed therein a finely divided alkyd resin in the infusible, insoluble condition.

21. A resinous composition comprising a heat-hardenable resin selected from the group consisting of phenol-aldehyde and urea-aldehyde resins having dispersed therein from 3 to 50% of a finely divided alkyd resin in the infusible, insoluble condition.

22. A resinous composition comprising a heat-hardenable resin selected from the group consisting of phenol-aldehyde and urea-aldehyde resins having dispersed therein an alkyd resin in the infusible, insoluble condition of a fineness of at least 100 mesh.

23. A resinous composition including a heat-hardened resin selected from the group consisting of phenol-aldehyde and urea-aldehyde resins having dispersed therein discrete particles of an alkyd resin in the infusible, insoluble condition.

24. A resinous composition including a heat-hardened resin selected from the group consisting of phenol-aldehyde and urea-aldehyde resins having dispersed therein from 3 to 50% of discrete particles of an alkyd resin in the infusible, insoluble condition.

GEORGE S. WEITH.